US011703999B2

(12) United States Patent
Baker et al.

(10) Patent No.: US 11,703,999 B2
(45) Date of Patent: *Jul. 18, 2023

(54) CHANGING VISUAL ASPECTS OF A GRAPHICAL USER INTERFACE TO BRING FOCUS TO A MESSAGE

(71) Applicant: MICROSOFT TECHNOLOGY LICENSING, LLC, Redmond, WA (US)

(72) Inventors: Casey Baker, Seattle, WA (US); Jose Rodriguez, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,241

(22) Filed: Jan. 31, 2022

(65) Prior Publication Data

US 2022/0334687 A1 Oct. 20, 2022

Related U.S. Application Data

(63) Continuation of application No. 16/919,009, filed on Jul. 1, 2020, now Pat. No. 11,256,393, which is a continuation of application No. 15/339,806, filed on Oct. 31, 2016, now Pat. No. 10,705,683.

(51) Int. Cl.
*G06F 3/0482* (2013.01)
*G06Q 10/10* (2023.01)
(Continued)

(52) U.S. Cl.
CPC .......... *G06F 3/0482* (2013.01); *G06F 40/279* (2020.01); *G06Q 10/10* (2013.01);
(Continued)

(58) Field of Classification Search
CPC .. G06F 3/04886; G06F 3/0482; G06F 17/211; G06F 3/04842; G06F 2203/04806;
(Continued)

(56) References Cited

U.S. PATENT DOCUMENTS 8,230,350 B2 * 7/2012 Dodsworth ............... G06F 7/06
715/805
8,631,353 B2 * 1/2014 Klassen ................ G06F 3/0488
715/752
(Continued)

FOREIGN PATENT DOCUMENTS

CN 103580987 A 2/2014
CN 104901961 A 9/2015
(Continued)

OTHER PUBLICATIONS

"Summons to Attend Oral Proceedings Issued in European Patent Application No. 17794575.5", dated Apr. 5, 2022, 9 Pages.
(Continued)

*Primary Examiner* — Wilson W Tsui
(74) *Attorney, Agent, or Firm* — Newport IP, LLC; Jacob P. Rohwer

(57) ABSTRACT

This disclosure describes a system that enables a user to efficiently view messages of a conversation that are more relevant to the user. The system is configured to display content of a first application within an application user interface (UI) and to determine that a message of a second application being monitored includes a trigger feature that comprises a piece of information or an interaction from another user that is worthy of the user's attention. The system can then generate a visual notification for the trigger feature. The visual notification can be displayed in association with a graphical element of the application UI. Upon receiving an indication of a selection of the visual notification, the system can switch from displaying the content of
(Continued)

the first application to displaying the message of the second application and trigger feature and/or change visual characteristics associated with the message to bring focus to the message.

20 Claims, 11 Drawing Sheets

(51) Int. Cl.
*G06Q 50/00* (2012.01)
*G06F 40/279* (2020.01)
*H04L 51/216* (2022.01)
*H04L 51/08* (2022.01)

(52) U.S. Cl.
CPC .............. *G06Q 50/01* (2013.01); *H04L 51/08* (2013.01); *H04L 51/216* (2022.05)

(58) Field of Classification Search
CPC ..... G06F 3/0416; G06F 40/279; G06Q 10/10; G06Q 50/01; H04L 51/08; H04L 51/16
See application file for complete search history.

(56) References Cited

U.S. PATENT DOCUMENTS

| | | |
|---|---|---|
| 2005/0289220 A1 | 12/2005 | Chen et al. |
| 2007/0061738 A1* | 3/2007 | Taboada ............... G06Q 10/107 715/752 |
| 2010/0175003 A1* | 7/2010 | Castellucci .......... G06Q 10/107 715/758 |
| 2011/0074790 A1* | 3/2011 | Fenn ................... G06F 3/04886 345/467 |
| 2012/0066615 A1 | 3/2012 | Brugler et al. |
| 2015/0334075 A1* | 11/2015 | Wang ...................... H04L 51/04 715/752 |
| 2016/0205163 A1* | 7/2016 | Patel ....................... H04L 67/02 709/204 |
| 2017/0351385 A1* | 12/2017 | Ertmann .............. G06Q 10/107 |
| 2018/0097902 A1* | 4/2018 | Meixner ............... G06F 3/0481 |

FOREIGN PATENT DOCUMENTS

| | | |
|---|---|---|
| CN | 105282013 A | 1/2016 |
| EP | 2073517 A1 | 6/2009 |
| WO | 2015109945 A1 | 7/2015 |

OTHER PUBLICATIONS

"Notice of Allowance Issued in European Patent Application No. 17794575.5", dated Nov. 7, 2022, 8 Pages.

"Office Action and Search Report Issued in Chinese Patent Application No. 201780067107.X", dated Nov. 30, 2022, 28 Pages.

"Decision to grant Issued in European Patent Application No. 17794575.5", dated Mar. 23, 2023, 2 Pages.

\* cited by examiner

CHANGING VISUAL ASPECTS OF A GRAPHICAL USER INTERFACE TO BRING FOCUS TO A MESSAGE

PRIORITY APPLICATION(S)

This patent application is a continuation of U.S. patent application Ser. No. 16/919,009, filed Jul. 1, 2020, which is a continuation of U.S. patent application Ser. No. 15/339,806, filed Oct. 31, 2016 (now U.S. Pat. No. 10,705,683), entitled "CHANGING VISUAL ASPECTS OF A GRAPHICAL USER INTERFACE TO BRING FOCUS TO A MESSAGE," which is hereby incorporated in its entirety by reference.

BACKGROUND

Communication and collaboration can be an important part of a person's life, in both a business context and a social context. Communication and collaboration tools have been developed with the aim of connecting people so that information and experiences can be shared. Such tools include messaging (e.g., group chats), voice calls, video calls, shared desktop, etc. Accordingly, such tools can capture, manipulate, transmit, receive, and/or reproduce messaging data (e.g., text), audio data, and/or visual data, and use various combinations of these types of data to provide a collaborative environment in which a group of users can communicate.

When using messaging systems and/or applications, a user often participates in multiple different group conversations, wherein each group conversation includes a number of users (i.e., participants) sharing information such as messages, images, files, etc. Typically, and for organizational purposes, an individual conversation can be established for a group of users around a topic or an issue. For instance, a group of employees working on a specific project can use a messaging application to create and host a conversation where the employees can collaborate and share information associated with progress of individual tasks of the project. In another example, a group of friends can use a messaging application to create and host a conversation so that the friends can collaborate and share information associated with fantasy football.

As the use of such messaging systems and/or applications grows and as a user wants to share information with respect to a variety of topics and/or issues, the user can find himself or herself being part of an increasing number of separate conversations at any given time (e.g., five, ten, twenty, etc.). In many cases, however, a graphical user interface of a messaging application (e.g., a messaging window) that is configured on a display screen of a user device is only able to have a limited number conversations displayed at a time (e.g., one conversation), and thus, the user is unable to actively monitor (e.g., view) messages from other conversations that are not being currently displayed on the display screen. Even further, a user may be using other functionality of his or her user device to do something other than actively monitor messages posted to conversations in the messaging application. That is, the user may be writing a document for work, the user may be browsing the Internet, the user may be coding a program, the user may be playing a video game, etc.

Consequently, it is impossible, or at the least very difficult, for a user to actively monitor and pay attention to all the messages recently posted in an increasing number of conversations that the user is participating in. Moreover, after a period of time when the user is not actively monitoring an ongoing conversation, the user can switch a graphical user interface (e.g., bring to the forefront of a display screen) to view the recently posted messages of the ongoing conversation that were missed. In this sort of situation, it is impossible, or at the least very difficult, for the user to efficiently locate previously unseen messages in the ongoing conversation that are more relevant or pertinent to the user. As an example, at a time when the user switches the graphical user interface, the user may have to unnecessarily spend valuable time scrolling through a large number of previously unseen messages (e.g., ten, twenty, fifty, one hundred, etc.) to catch up on how the conversation has developed since the user last viewed the conversation and to locate the messages that are more relevant or pertinent to the user.

As such, there is a need for an improved messaging system that addresses these issues and that helps a user locate, at a time that is more conducive or convenient to the user, messages in an ongoing conversation that are more relevant or pertinent. It is with respect to these and other considerations that the disclosure made herein is presented.

SUMMARY

This disclosure describes a system configured to enable a user to efficiently locate and view messages of an application that are likely to be more relevant or pertinent to the user. The application can host a messaging conversation is hosted for a group of users, such that individual users in the group can use a computing device to post a message to, or submit a message for, the messaging conversation. In response to the post or submission, the system is configured to add the message to the messaging conversation so that it can be shared with other users of the group. Consequently, the system described herein collects and aggregates a number of messages received from computing devices of a group of users, and organizes the messages in a way that represents an ongoing conversation between the group of users (e.g., display the messages in a threaded order based on a time when they were received and/or submitted). While many of the examples described herein reflect that a messaging conversation comprises messaging data, or messages that include text, it is understood in the context of this disclosure that other types of information can additionally or alternatively be shared via a messaging conversation, such as an image, a video, a document, a spreadsheet, etc. A messaging conversation may be referred to herein as a "conversation".

To enable the user to efficiently locate and view messages of a conversation that are likely to be more relevant or pertinent to the user, the system described herein is configured to determine that a message in the conversation includes a feature. A feature can comprise a piece of information and/or an interaction provided or initiated by another user, the piece of information and/or the interaction likely being worthy of the user's attention. Moreover, an occurrence of a feature in messaging data can comprise a condition that triggers functionality to notify a computing device and/or a user of the computing device of the occurrence of the feature, and accordingly, the features described herein may be referred to as "trigger" features. The system can define a trigger feature based on a determination of whether the user is likely to take action in response to viewing the trigger feature (e.g., the user is likely to provide an answer when a question was specifically directed to the user), or a determination of whether the user likely wants to be informed of the trigger feature (e.g., the user likely wants to view a comment from another user made directly in response to a previous message posted by the user). In accordance with examples further described herein, a trigger feature associated with a message can comprise: a mention (e.g., a tag) of an identity associated with the user (e.g., a "call-out" or an "at mention" or an "@mention" of a name such as "Carol"), a mention of a team of users of which the user is part (e.g., a call-out or a "team mention" of a team such as the "legal team"), a mention of a conversation channel that is followed by the user (e.g., a call-out or a "channel mention" such as the "shipping channel"), an indication that another user liked a message that was previously posted by the user, or a comment on the message that was previously posted by the user. Other examples of trigger features can include: keyword alerts based on occurrences or detection of keywords (e.g., being tracked by a user), calendar alerts based on occurrences of a date or a mention of an event, to do item alerts, and so forth.

In response to determining that the message in the conversation includes a trigger feature, the system is configured to associate the trigger feature with a user and to generate a visual notification associated with the feature. The visual notification is generated for display via a computing device of the user (e.g., a computing device at which the user is currently logged-in to a messaging application to view various conversations). In one example, the visual notification is displayed in association with a graphical element of an application UI that is currently displaying content of an application other than the application hosting a messaging conversation that is being monitored for trigger features. Upon viewing the visual notification, the user knows that the trigger feature worthy of the user's attention is associated with a message posted or submitted in a conversation hosted by the messaging application.

Subsequently, at a time when the user is ready and/or available to shift his or her attention to the conversation, the user can provide input that selects or activates the visual notification. The selection may be delayed such that it occurs after the message was initially posted and/or the visual notification was displayed (e.g., five minutes later, fifteen minutes later, an hour later, a whole day later, etc.). In response to receiving the input, the system is configured to identify a portion of the conversation that includes the message associated with the trigger feature. The portion of the conversation also includes one or more other messages that surround the message in the conversation (e.g., messages posted around the same time in an event the messages are organized based on a time of posting to the conversation). In some examples, the conversation comprises a series of messages that have been posted more recently than the message that is associated with the trigger feature, and thus, the portion of the conversation identified for display includes older messages (e.g., posted five minutes ago, posted fifteen minutes ago, posted an hour ago, posted the previous day, etc.). An application user interface can then be switched from displaying content of one application to displaying the portion of the conversation of a different application. The application user interface is configured to bring focus to the message associated with the trigger feature that is likely worthy of the user's attention (e.g., bring focus to the message that mentions the user's name). As such, the system is configured to visually distinguish the message from other surrounding messages in the displayed portion of the conversation when the user switches his or her display screen to view the conversation (e.g., via selection of the visual notification). For example, the system can scale one or more visual aspects associated with the message from a normal size to an enlarged size for a predetermined period of time (e.g., one second, two seconds, three seconds, etc.) to bring the focus to the message, and then the system can return the one or more visual aspects associated with the message from the enlarged size back to the normal size after the predetermined period of time expires.

In accordance with the examples described herein, a visual aspect can comprise: text, an avatar associated with an identity of a user that caused or is responsible for the trigger feature (e.g., posted the message associated with the trigger feature, interacted with the message associated with the trigger feature, etc.), a container that comprises the message associated with the trigger feature and that visually separates the message from surrounding messages, an attachment to the message associated with the trigger feature, and so forth. Other ways to visually distinguish the message from other surrounding messages can include increasing an amount of opaqueness (e.g., dimming) of content that surrounds the message to further bring focus to the message, changing a color of text or a highlight color of a container to a different color, implementation of flashing of text and/or a container, etc.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 also illustrates example types of trigger features that are associated with a message of a conversation and that occurrences of which can cause the visual notification to be displayed.

DETAILED DESCRIPTION

Figure 1:
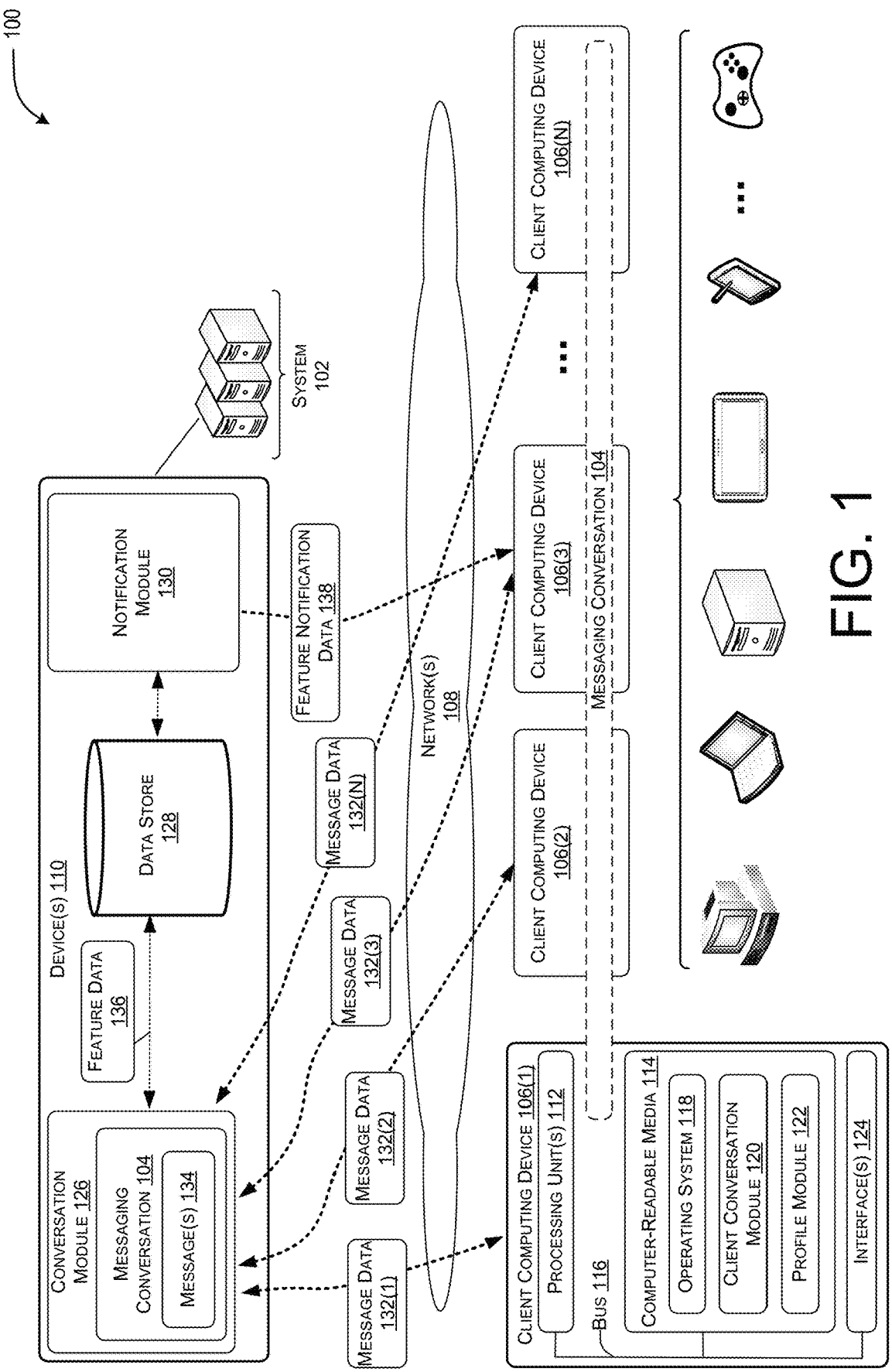
FIG. 1 is a diagram illustrating an example environment in which a system can operate to determine that a message is associated with a trigger feature that causes a visual notification to be displayed, and to generate a graphical user interface that brings focus to the message in response to receiving input that selects the visual notification.

This disclosure describes a system in which a user is enabled to efficiently locate and view messages of the messaging conversation that are likely to be more relevant or pertinent to the user. Accordingly, the system is configured to determine that a message in the conversation is associated with a trigger feature that comprises a piece of information and/or an interaction from another user that is likely worthy of the user's attention. The system can then generate a visual notification associated with the trigger feature, the visual notification being for display via a computing device of the user. In at least one example, the visual notification can be displayed in association with a graphical element that represents the conversation. Consequently, upon viewing the visual notification, the user is not only informed of a posted message and/or an interaction that may be of particular pertinence or relevance, but the user also knows which conversation the message and/or the interaction is included in.

As described above, the use of communication and collaborative tools to share information and/or work on a project is increasing, and thus, a user may often employ a messaging application to participate in a variety of conversations (e.g., five conversations, ten conversations, twenty conversations, etc.). However, it is typical for a display area of a graphical user interface of a messaging application to only display one "active" conversation that a user can monitor, view and/or engage with at any given time. Alternatively, the user may be using a computing device to perform other functions, and thus, the user may not be actively monitoring or viewing messages from any conversations.

By displaying a visual notification in association with a graphical element that represents the conversation, the user knows that the trigger feature is associated with a message posted or submitted in that specific conversation as opposed to other conversations the user is participating in. Consequently, the user can decide whether and/or when to devote his or her attention to a particular topic or issue for which the conversation was created. At a time when the user is ready and/or available to shift his or her attention to the conversation, the user can provide input that selects or activates the visual notification. In response to receiving the input, the system is configured to identify a portion of the conversation that includes the message associated with the trigger feature and generate a graphical user interface to display the portion of the conversation. The graphical user interface is configured to bring focus to the message associated with the trigger feature that is likely worthy of the user's attention (e.g., bring focus to the message that mentions the user's name) by visually distinguishing the message from other surrounding messages in the displayed portion of the conversation.

Consequently, the system and techniques described herein improve a user experience because a user can quickly view messages amongst a variety of conversations that are likely to be more relevant or pertinent to the user. Moreover, by immediately taking the user to a portion of the conversation that comprises a message with a trigger feature that is likely to be more relevant or pertinent, computing resources can be conserved. For instance, the user no longer is required to spend time and/or consume computing resources to scroll through a large number of missed messages in a conversation to determine which ones are pertinent or relevant.

Various examples, scenarios, and aspects are described below with reference to FIGS. 1-9.

FIG. 1 is a diagram illustrating an example environment 100 in which a system 102 can host a messaging conversation 104 for a plurality of client computing device(s) 106(1) through 106(N). The system 102 operates to determine that a message of the conversation is associated with a trigger feature that is likely to be relevant or pertinent to a user, and therefore, the system 102 causes a visual notification to be displayed so the user is informed of the message, as further described herein. In response to a selection of the visual notification, the system 102 can generate a graphical user interface that brings focus to the message. Example graphical user interfaces are provided herein with respect to FIGS. 6A-6C and FIG. 9.

In various examples, the system 102 can be operated by an entity that provides communication and collaboration tools to client computing devices 106(1) through 106(N) (where N is a positive integer number having a value of two or greater). The client computing devices 106(1) through 106(N) enable users to participate in the messaging conversation 104 such that a user can post a message to the conversation and also view other messages posted by other users. In this example, the messaging conversation 104 may be hosted, over one or more network(s) 108, by the system 102. That is, the system 102 may provide a service that enables users of the client computing devices 106(1) through 106(N) to participate in the messaging conversation 104. As an alternative, the messaging conversation 104 may be hosted by one of the client computing devices 106(1) through 106(N) utilizing peer-to-peer technologies, and therefore, some or all of the functionality described herein can be implemented without the use of system 102.

The system 102 includes device(s) 110. The device(s) 110 and/or other components of the system 102 can include distributed computing resources that communicate with one another and/or with remote devices such as the client computing devices 106(1) through 106(N), via the one or more network(s) 108. In some examples, the system 102 can be an independent system that is tasked with managing aspects of the messaging conversation 104.

Network(s) 108 can include, for example, public networks such as the Internet, private networks such as an institutional and/or personal intranet, or some combination of private and public networks. Network(s) 108 can also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 can utilize communications protocols, including packet-based and/or datagram-based protocols such as Internet protocol ("IP"), transmission control protocol ("TCP"), user datagram protocol ("UDP"), or other types of protocols. Moreover, network(s) 108 can also include a number of devices that facilitate network communications and/or form a hardware basis for the networks, such as switches, routers, gateways, access points, firewalls, base stations, repeaters, backbone devices, and the like.

In some examples, network(s) 108 can further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 can include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 can include a diverse variety of device types and are not limited to a particular type of device. Device(s) 110 can represent, but are not limited to, server computers, desktop computers, web-server computers, personal computers, mobile computers, laptop computers, tablet computers, or any other sort of computing device.

A client computing device (e.g., one of client computing device(s) 106(1) through 106(N), which may be generically referred to herein as a "computing device 106") may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. In some implementations, a client computing device includes input/output ("I/O") interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like). A computing device 106 can also include a combination of two or more devices, such as a mobile phone in combination with a wearable device.

Computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 can include, for example, an operating system 118, a client conversation module 120, a profile module 122, and other modules, programs, or applications that are loadable and executable by processing units(s) 112.

Each of computing device(s) 106(1) through 106(N) can also include one or more interface(s) 124 to enable communications between computing device(s) 106(1) through 106(N) and other networked devices, such as device(s) 110. Such network interface(s) 124 can include one or more network interface controllers (NICs) or other types of transceiver devices to send and receive communications and/or data over a network 108.

In the example environment 100 of FIG. 1, computing devices 106(1) through 106(N) use their respective client conversation modules 120 to connect with one another and/or other external device(s) in order to participate in the messaging conversation 104. When executing client conversation modules 124, computing devices 106(1) through 106(N) can share and/or receive data of the messaging conversation 104, over the network(s) 108. In some instances, a client conversation module can comprise a messaging application ("app") that organizes a variety of conversations.

In various examples, the computing device(s) 106(1) through 106(N) use their respective profile module 122 to generate user profiles associated with messaging, and provide the user profiles to other computing devices and/or to the device(s) 110 of the system 102. A user profile may include one or more of an identity of a user (e.g., a name, a unique identifier ("ID"), etc.), a user avatar, personal data (e.g., age, title, position, etc.), location data, status data (e.g., online, offline, available, busy, etc.) and so forth. Accordingly, user profiles may be utilized to register participants for messaging conversations. For instance, user profiles can be associated with log-in techniques and/or credential verification that enable a user to be added to a messaging conversation 104 so that information can be exchanged with other participants in the messaging conversation 104 (e.g., join a conversation).

As shown in FIG. 1, the device(s) 110 of the system 102 includes a server-side conversation module 126, a data store 128, and a notification module 130. The conversation module 126 is configured to exchange (e.g., receive and/or transmit), as part of an individual messaging conversation 104 being hosted, message data 132(1) through 132(N) with computing devices 106(1) through 106(N), where the message data 132(1) through 132(N) includes messages 134. To this end, messages 134 of the messaging conversation 104 can be shared with all or some of the participants of the messaging conversation 104. In addition to text of a message, message data can include other types of information associated with a message, such as an avatar, an image, an attachment (e.g., a file), an indication of an interaction (e.g., a like of a previously posted message), etc.

In various examples, upon receiving instances of message data, the conversation module 126 is configured to analyze the message data and determine whether a trigger feature that causes a visual notification to be displayed is associated with a message. Different types of trigger features include: a mention (e.g., a tag) of an identity associated with the user (e.g., a "call-out" or an "@mention" of a name such as "Carol"), a mention of a team of users that includes the user (e.g., a call-out or "team mention" of a team such as the "legal team"), a mention of a conversation channel that is followed by the user (e.g., a call-out or "channel mention" such as the "shipping channel"), an indication that another user liked a message that was previously posted by the user, or a comment on the message that was previously posted by the user. Other example types of trigger features can include: keyword alerts based on occurrences or detection of keywords (e.g., being tracked by a user), calendar alerts based on occurrences of a date or a mention of an event, to do item alerts, and so forth.

The conversation module 126 is configured to exchange feature data 136 with the data store 128 so that the determination can be made. For instance, the data store 128 can maintain a user identity, a list of users that are part of a team, a list of users that follow a conversation channel, and/or user-defined settings that enable/disable notifications based on types of features (e.g., a user may want to receive a notification if his or her identity is mentioned but not when another user merely likes a message previously posted by the user).

The notification module 130 is configured to transmit feature notification data 138 to the client computing devices 106(1) through 106(N). The transmission can be based on a determination by the conversation module 126 that a message is associated with a trigger feature, and that a particular user and/or computing device is to be notified of the trigger feature. In the example of FIG. 1, the notification module 130 transmits feature notification data 138 to client computing device 106(3). As described above and by example, this may be in response to a user of one of client computing devices 106(1), 106(2), 106(N) mentioning an identity of a user of client computing device 106(3) in a message 134 posted to the messaging conversation 104, and thus, the system 102 notifies the user of client computing device 106(3) of the identity being mentioned.

Figure 2:
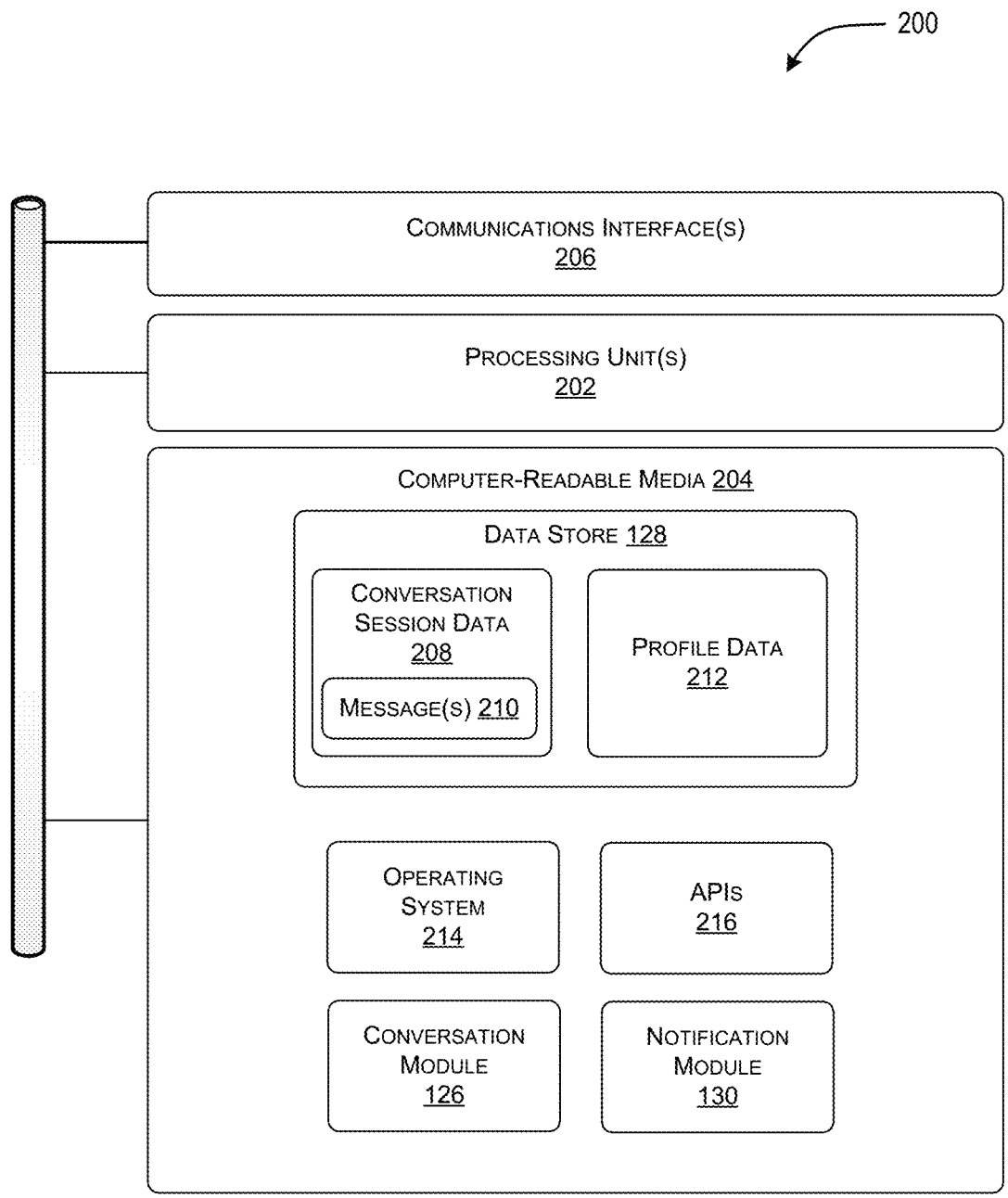
FIG. 2 is a diagram illustrating components of an example device configured to determine that a message is associated with a trigger feature that causes a visual notification to be displayed, and to generate a graphical user interface that brings focus to the message in response to receiving input that selects the visual notification.

FIG. 2 is a diagram illustrating components of an example device 200, such as a device 110, configured to determine that a message is associated with a trigger feature that causes a visual notification to be displayed, and to generate a graphical user interface that brings focus to the message in response to receiving user input that selects the visual notification. The example device 200 is configured to provide a messaging conversation 104 amongst client computing devices, such as client computing devices 106(1) through 106(N). The device 200 can include one or more processing unit(s) 202, computer-readable media 204, and/or communication interface(s) 206. The components of the device 200 are operatively connected, for example, via a bus, which can include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

Computer-readable media 204 can include the data store 128. In some examples, the data store 128 includes data storage such as a database, data warehouse, or other type of structured or unstructured data storage. In some examples, the data store 138 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 128 can store data for the operations of processes, applications, components, and/or modules stored in computer-readable media 204 and/or executed by processing unit(s) 202 and/or accelerator(s). For instance, in some examples, data store 128 can store conversation session data 208 (e.g., including messages 210), profile data 212 (e.g., teams that a user is part of, conversation channels followed by a user, user-defined notification settings based on trigger feature types, other data from a user profile, etc.), and/or other data. The conversation session data 208 can include a number of participants in a messaging conversation such as messaging conversation 104, data associated with each participant (e.g., user profile data provided by the profile module 122), activity that occurs in the messaging conversation, and/or other data related to when and how the messaging conversation is conducted or hosted.

The computer-readable media 204 can also include operating system 214 and application programming interface(s) 216 configured to expose the functionality and the data of the device(s) 110 (e.g., example device 200) to external devices associated with the client computing devices 106(1) through 106(N). Additionally, the computer-readable media 204 includes one or more modules such as the conversation module 126 and the notification module 130, although the number of illustrated modules is just an example, and the number may vary higher or lower. That is, functionality described herein in association with the illustrated modules may be performed by a fewer number of modules or a larger number of modules on one device or spread across multiple devices.

Figure 3:
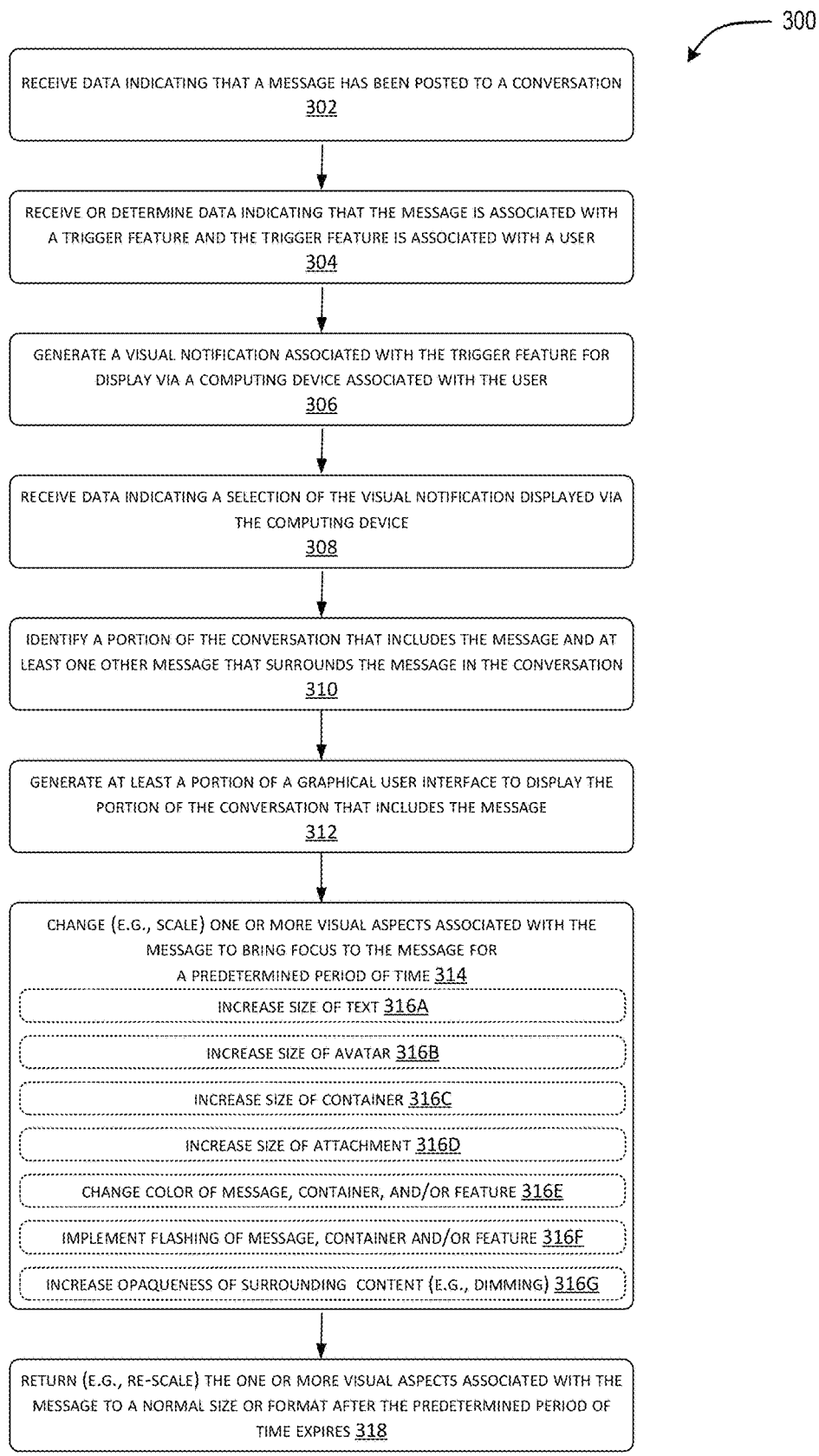
FIG. 3 is a flow diagram of an example method for determining that a message is associated with a f trigger eature that causes a visual notification to be displayed, and for generating a graphical user interface that brings focus to the message in response to receiving input that selects the visual notification.

FIG. 3 is a flow diagram of an example method 300 for determining that a message is associated with a trigger feature that causes a visual notification to be displayed, and for generating a graphical user interface that brings focus to the message in response to receiving input that selects the visual notification. The operations of the example method 300 disclosed herein are not necessarily presented in any particular order and the performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. The example method 300 can end at any time and need not be performed in its entirety.

Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented as a sequence of computer implemented acts or program modules running on a computing system and/or as interconnected machine logic circuits or circuit modules within the computing system. The implementation is a matter of choice dependent on the performance and other requirements of the computing system. Accordingly, the logical operations described herein may be referred to variously as operations, states, structural devices, acts, or modules. These operations, states, structural devices, acts, and/or modules may be implemented in software, in firmware, in special purpose digital logic, or any combination thereof.

In various implementations, individual operations of the example method 300 can be performed by the system 102 (e.g., one of device(s) 110), by a computing device 106, or by a combination of the system 102 and the computing device 106.

At 302, data indicating that a message has been posted to a conversation is received. For instance, the system 102 (e.g., the conversation module 126) and/or a computing device 106 (e.g., the client conversation module 120) can receive the data from one of the computing devices being used by a participant of the conversation 104, and can add the message to the conversation 104 so that it can be shared and/or displayed with other computing device being used by other participants of the conversation.

At 304, data indicating that the message is associated with a trigger feature is determined or is received. For example, the system 102 (e.g., the conversation module 126) and/or a computing device 106 (e.g., the client conversation module 120) can analyze a message to determine if a trigger feature is present or occurs (e.g., a specific user identity is mentioned). In some examples, this data can also indicate that the trigger feature is associated with a user and, once determined, can be transmitted to another device (e.g., from a computing device 106 to a device 110, from device 110 to a computing device 106, from a computing device 106 to another computing device 106).

At 306, a visual notification associated with the trigger feature is generated for display. For instance, the system 102 (e.g., the conversation module 126) and/or a computing device 106 (e.g., the client conversation module 120) can generate and/or transmit the visual notification to that it can be displayed on a display screen via a computing device, examples of which are further described herein.

At 308, data indicating a selection of the visual notification displayed via the computing device is received. For example, a computing device 106 (e.g., the client conversation module 120) can receive input from a user that selects the visual notification and/or can transmit the input to the system 102 (e.g., the conversation module 126) so that it receives the input as well.

At 310, a portion of the conversation that includes the message (that includes the feature) is identified. For instance, the system 102 (e.g., the conversation module 126) and/or a computing device 106 (e.g., the client conversation module 120) can identify where, in the conversation, the message occurs. In addition to the message, the portion of the conversation identified also includes at least one other message that surrounds, or is adjacent/near to, the message.

At 312, at least a portion of a graphical user interface that displays the portion of the conversation is generated. For instance, the system 102 (e.g., the conversation module 126) and/or a computing device 106 (e.g., the client conversation module 120) can generate and/or transmit the portion of the graphical user interface to that it can be displayed on a display screen via a computing device, examples of which are further described herein.

At 314, one or more visual aspects associated with the message are changed (e.g., scaled) to bring focus to the message for a predetermined period of time. In a first example, a change of a visual aspect can comprise temporarily increasing a size of text 316A of the message from a normal text size to an enlarged text size (e.g., by a predetermined scaling factor such as 120%). In a second example, a change of a visual aspect can comprise temporarily increasing a size of a user avatar 316B of a user that posted the message from a normal avatar size to an enlarged avatar size (e.g., by a predetermined scaling factor). In a third example, a change of a visual aspect can comprise temporarily increasing a size of a container 316C that contains the message from a normal container size to an enlarged container size (e.g., by a predetermined scaling factor). In a fourth example, a change of a visual aspect can comprise temporarily increasing a size of an attachment 316D to the message from a normal attachment size to an enlarged attachment size (e.g., by a predetermined scaling factor). In a fifth example, a change of a visual aspect can comprise temporarily changing a color of the message, the container, and/or the trigger feature 316E from a first color (e.g., black text and/or white container background) to a second color text (e.g., red text and/or yellow container background). In a sixth example, a change of a visual aspect can comprise temporary implementation of flashing of the message, the container, and/or the trigger feature 316F. In a seventh example, a change of a visual aspect can comprise temporarily increasing the opaqueness of surrounding content 316G (e.g., dimming the surrounding content to take the user's focus away from the messages that surround the message worthy of the user's focus). It is understood, in the context of this disclosure, that any number of the examples described above can be used in combination with one another. Moreover, the examples provided herein are further described and/or illustrated herein.

At 318, the one or more visual aspects associated with the message that were changed are returned to their normal size and/or normal format after the predetermined period of time expires (i.e., lapses).

Figure 4:
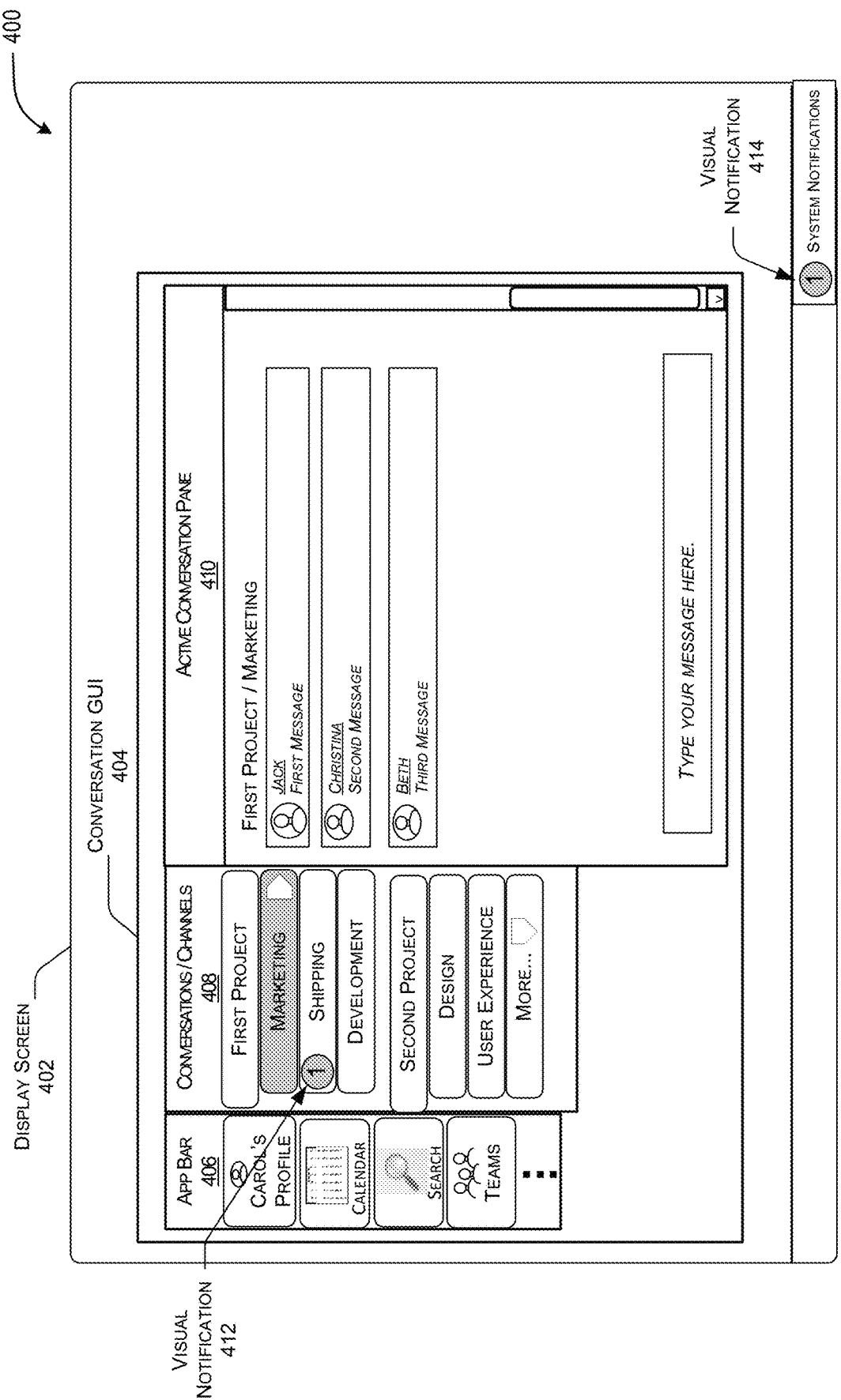
FIG. 4 is an example of a display screen presenting a graphical user interface that illustrates a visual notification indicating that a trigger feature is associated with a message of a conversation (e.g., a conversation that is not currently being displayed), and therefore, the message is likely of interest to a user.

FIG. 4 is an example 400 of a display screen 402 presenting a graphical user interface (GUI) 404 that illustrates a visual notification indicating that a trigger feature is associated with a message of a conversation (e.g., a conversation that is not currently being displayed), and therefore, the message is likely of interest to a user. As illustrated, the graphical user interface 404 may be associated with a messaging application such that it contains conversations, and therefore, may be referred to herein as a conversation GUI 404. In the example of FIG. 4, and the examples further described herein with respect to FIGS. 5-9, the conversation GUI 404 includes an app bar 406, a list of conversations/channels 408, and an active conversation pane 410.

The app bar 406 can contain elements that provide access to particular functionality of the messaging application and/or other applications being executed on a computing device 106. As illustrated and by example only, the app bar 406 includes: an element that can access data associated with Carol's Profile, an element that can access calendar data, an element that can access search functionality, an element that can access teams that Carol is a part of, and so forth.

The conversations/channels 408 includes a list of conversations that a user (e.g., Carol) is participating in. A conversation may also be referred to as a channel, such that a user can follow or tune into the messages that have been posted in the particular conversation/channel. As illustrated and by example only, the list of conversations/channels 408 are organized into a first project and a second project. The first project includes separate conversations related to "marketing", "shipping", and "development". The second project includes separate conversations related to "design" and "user experience", as illustrated.

As described above, a number of conversations/channels 408 that a user (e.g., Carol) participates in and follows is increasing (e.g., due to a large number of responsibilities in a workplace). While the example in FIG. 4 illustrates five conversations for ease of discussion (e.g., titled "marketing", "shipping", "development", "design", and "user experience"), it is contemplated that a user may often participate and follow a larger number of conversations/channels 408, such that there may not be enough space on the display screen 402 and/or the conversation GUI 404 to list them all (e.g., as evidenced by the element that allows you to select "more" to see additional conversations/channels on the list).

Moving on, FIG. 4 illustrates that the user (e.g., Carol) is currently engaged in the first project/marketing conversation. Accordingly, the active conversation pane 410 shows messages posted by users Jack, Christina, and Beth, and the messages are displayed so they can be viewed by Carol. Moreover, the active conversation pane 410 of the conversation GUI 404 enables Carol to add, or post, a message to the first project/marketing conversation via the input element "Type Your Message Here", and the message is shared with Jack, Christina, Beth and other users who participate in the first project/marketing conversation.

While Carol is actively engaged in the first project/marketing conversation, she is unable to actively monitor messages posted in other conversations, such as the "shipping", "development", "design", and/or "user experience" conversations. Consequently, FIG. 4 illustrates that a visual notification 412 can be generated and displayed so that Carol is notified (e.g., made aware) of an occurrence of a trigger feature in a conversation that is not being displayed. For example, the visual notification 412 can indicate a number of occurrences (e.g., one) of trigger features that are likely worthy of Carol's attention, as further described herein with respect to FIGS. 5 and 6A-6C. The visual notification 412 can be displayed in association with a specific conversation in which the trigger feature occurs (e.g., first project/shipping). Alternatively or additionally, a visual notification 414 can be generated for display in a different area, such as a systems notifications area that aggregates notifications for multiple applications being executed by a computing device.

Figure 5:
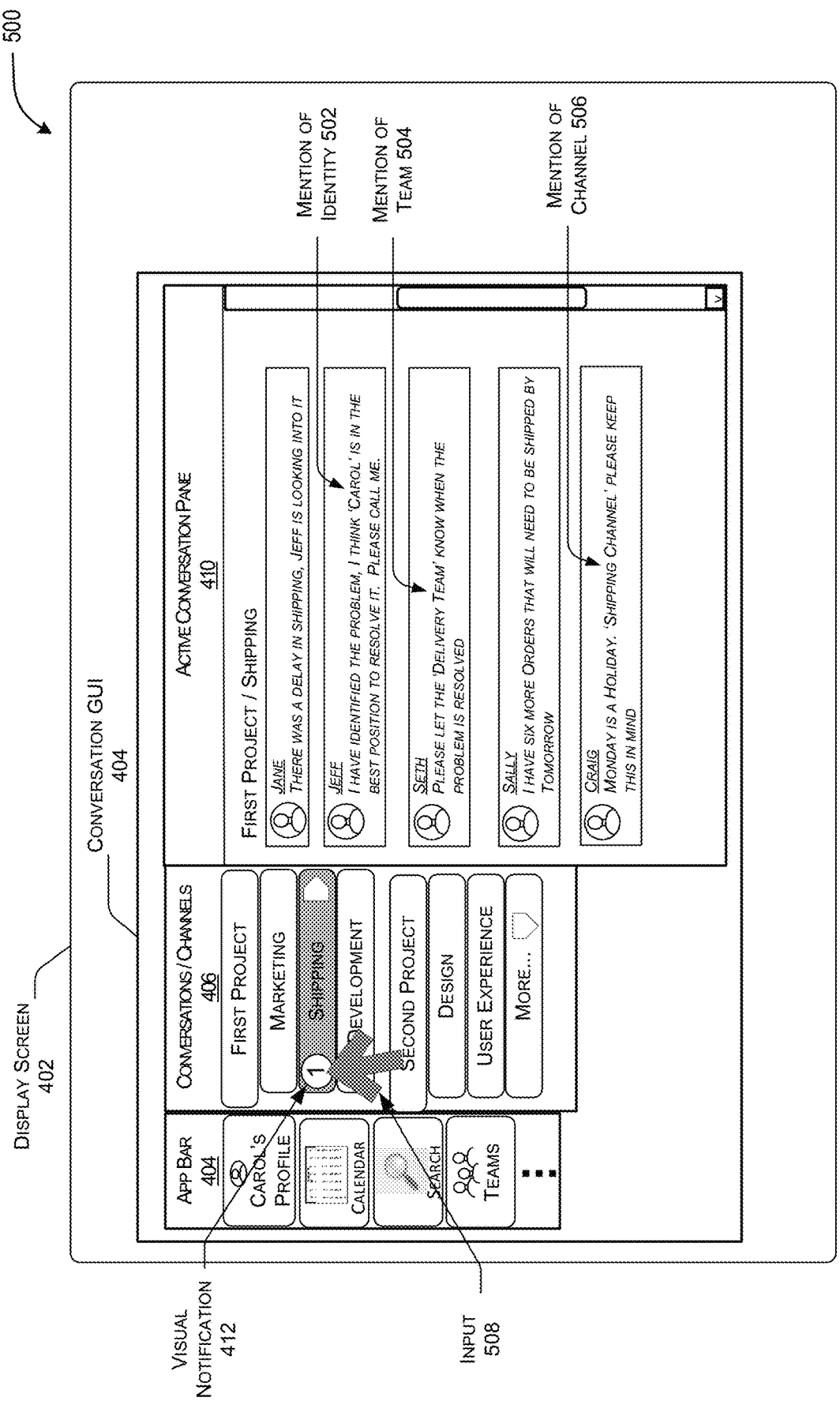
FIG. 5 is an example of a display screen presenting a graphical user interface that illustrates example input that selects the visual notification.

Turning to FIG. 5, an example 500 of the same display screen 402 presenting the conversation GUI 404 is illustrated. FIG. 5 illustrates examples messages associated with various types of trigger features, any one of which could have been missed by Carol while she was engaged in the first project/marketing conversation (as illustrated in FIG. 4). Any one of these trigger features can cause the visual notification 412 to be displayed. For example, a message from Jeff includes a mention of an identity 502 (e.g., Carol's name). Moreover, a message from Seth includes a mention of a team 504 (e.g., the Delivery Team to which Carol belongs). And a message from Craig includes a mention of a channel 506 (e.g., the Shipping Channel followed by Carol).

Figure 6A:
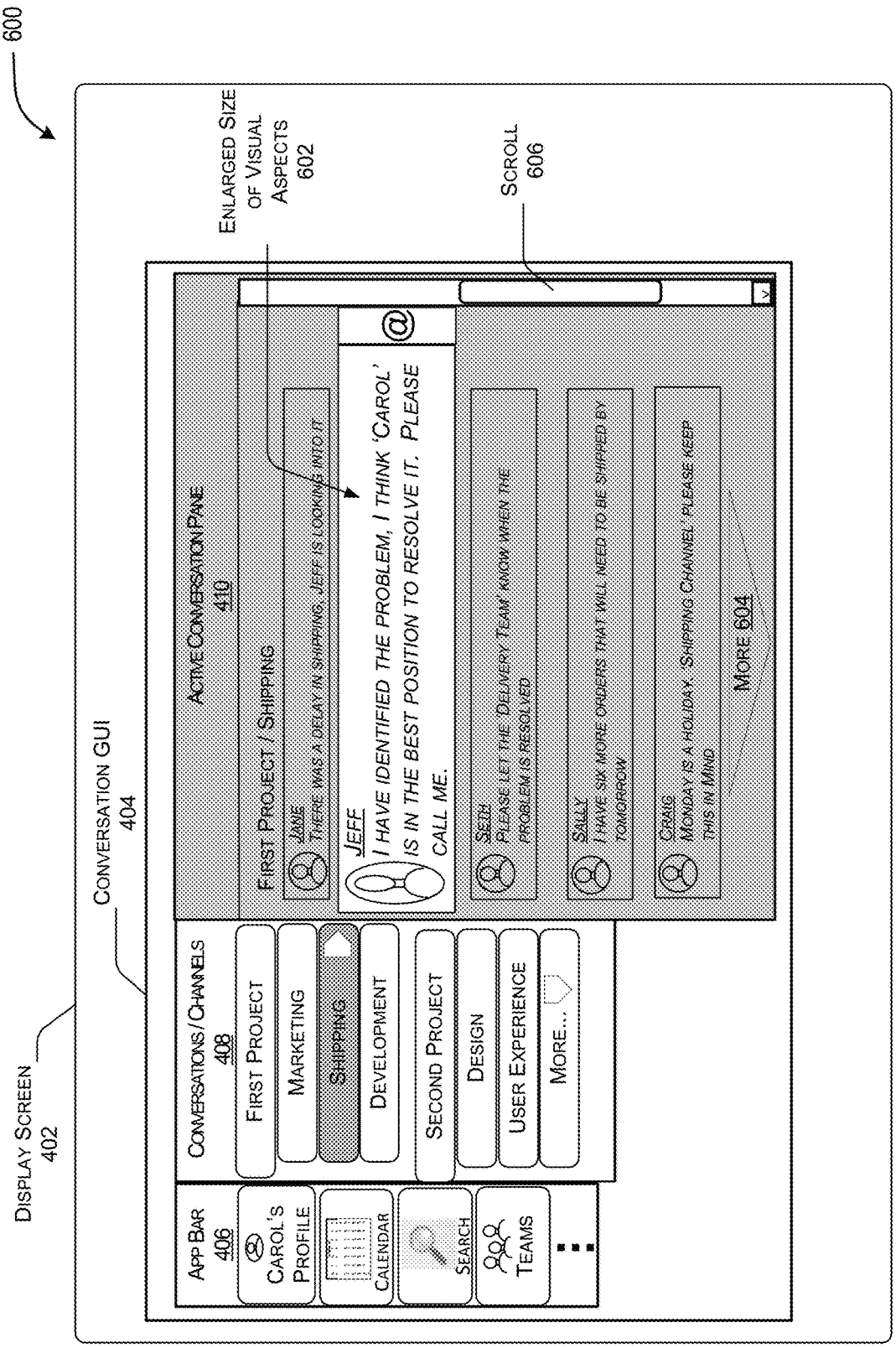
FIG. 6A is an example of a display screen presenting a graphical user interface that illustrates a view of a portion of a conversation and how visual aspect(s) are changed, in response to the input that selects the visual notification, to bring focus to a message that includes a first type of trigger feature (e.g., a mention of a user identity).
Figure 6B:
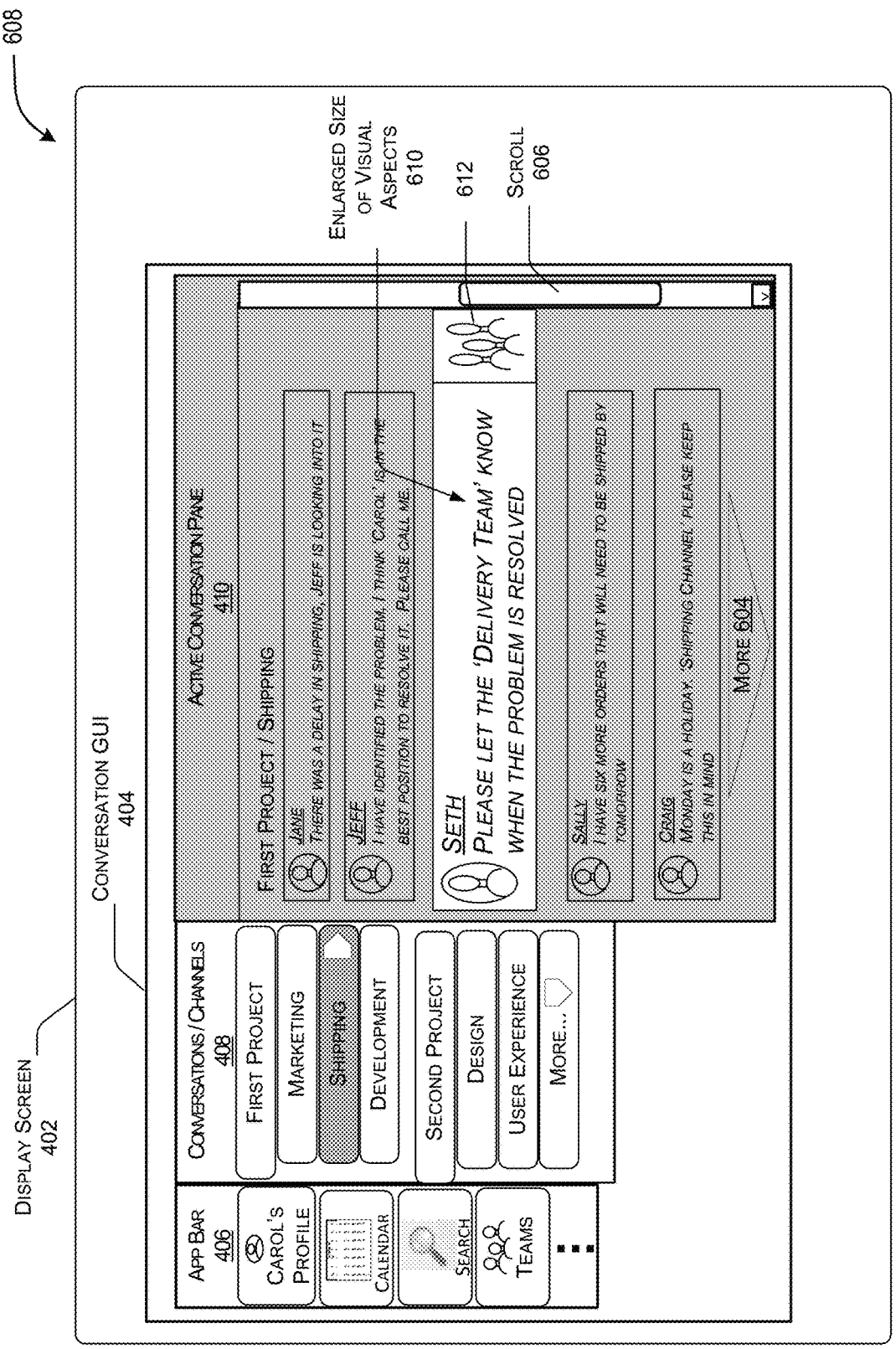
FIG. 6B is another example of a display screen presenting a graphical user interface that illustrates a view of a portion of a conversation and how visual aspect(s) are changed, in response to the input that selects the visual notification, to bring focus to a message that includes a second type of trigger feature (e.g., a mention of a team of users).
Figure 6C:
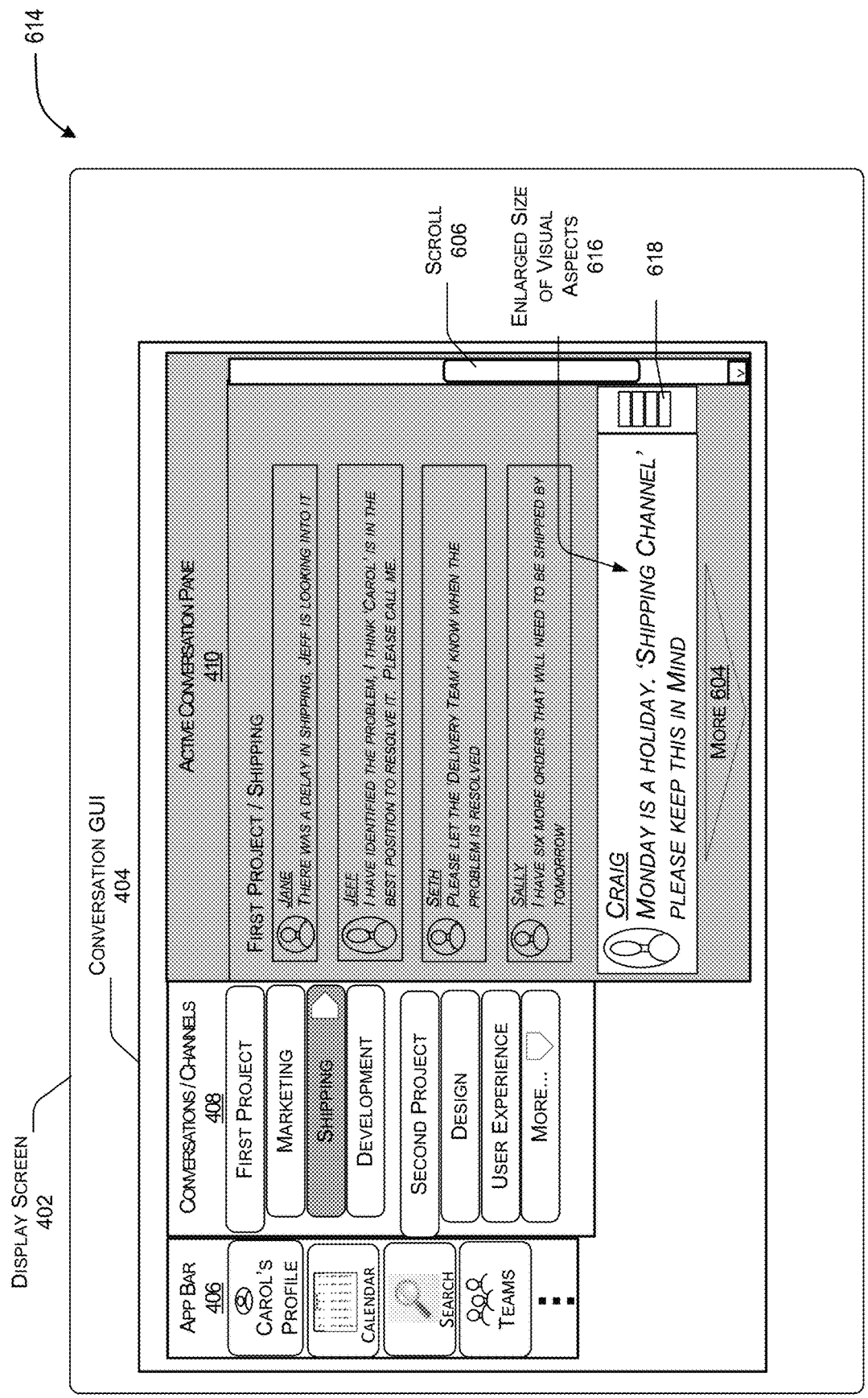
FIG. 6C is yet another example of a display screen presenting a graphical user interface that illustrates a view of a portion of a conversation and how visual aspect(s) are changed, in response to the input that selects the visual notification, to bring focus to a message that includes a third type of trigger feature (e.g., a mention of a conversation channel).

Upon viewing the visual notification 412, and at a time that is convenient for her based on availability and priority, Carol uses a mechanism to provide input 508 that selects the visual notification. FIGS. 6A-6C illustrate what can happen in response to Carol's input 508 that selects the visual notification 412.

In the example 600 of FIG. 6A, in response to Carol's input 508 that selects the visual notification 412, the active conversation pane 410 is switched to the first project/shipping conversation and one or more visual aspects of the message from Jeff that includes a mention of Carol's identity are scaled (e.g., by a predetermined factor) so that the size increases from a normal size to an enlarged size 602. This will help bring Carol's focus to the message. For example, the size of Jeff's avatar can be increased, the size of the text of the message can be increased, and/or the size of the container can be increased (e.g., graphically extended vertically and/or horizontally as shown). In addition, a symbol (e.g., may also be referred to herein as a "nubbin") can be associated with the message indicating a type of feature (e.g., "@" represents a mention of an identity such as "@Carol"). Additionally or alternatively, content that surrounds Jeff's message (e.g., the messages displayed around Jeff's message) can be dimmed to help bring Carol's focus to Jeff's message.

As described above, the messages displayed in the active conversation pane 410, in response to Carol's input 508 that selects the visual notification 412, is a portion of the first project/shipping conversation that may have occurred a while before Carol selected the visual notification (e.g., five minutes prior, ten minutes prior, an hour prior, a whole day prior, etc.). Accordingly, Carol is returned to the portion of the conversation with the message and associated feature, and Carol is provided with an indication that there are more recently posted messages in the conversation (e.g., the "more" indication 604) and/or functionality that enables her to scroll 606 down to the more recently posted messages. The "more" indication 604 can also indicate a number of non-displayed messages that have subsequently been posted after Craig's message in FIG. 6A (e.g., 20 more messages, 100 more messages, etc.).

In the example 608 of FIG. 6B, in response to Carol's input 508 that selects the visual notification 412, the active conversation pane 410 is switched to the first project/shipping conversation and one or more visual aspects of the message from Seth that includes a mention of the Delivery Team, to which Carol belongs, are scaled so that the size increases from a normal size to an enlarged size 610. This will help bring Carol's focus to the message. Again, and by example, the size of Seth's avatar can be increased, the size of the text of the message can be increased, and/or the size of the container can be increased (e.g., graphically extended vertically and/or horizontally as shown). In addition, the nubbin can be associated with the message indicating a type of feature (e.g., the illustrated upper bodies 612 represent a mention of a team). Additionally or alternatively, content that surrounds Seth's message can be dimmed to help bring Carol's focus to Seth's message.

In the example 614 of FIG. 6C, in response to Carol's input 508 that selects the visual notification 412, the active conversation pane 410 is switched to the first project/shipping conversation and one or more visual aspects of the message from Craig that includes a mention of the Shipping Channel, that Carol follows, are scaled so that the size increases from a normal size to an enlarged size 616. This will help bring Carol's focus to the message. Again, and by example, the size of Craig's avatar can be increased, the size of the text of the message can be increased, and/or the size of the container can be increased (e.g., graphically extended vertically and/or horizontally as shown). In addition, the nubbin can be associated with the message indicating a type of feature (e.g., the illustrated rectangles 618 represent a mention of a channel). Additionally or alternatively, content that surrounds Craig's message can be dimmed to help bring Carol's focus to Craig's message.

In some implementations, the visual notification can be generated to indicate a type of trigger feature that caused the visual notification to be displayed. For example, the visual notification can include a symbol associated with a type (e.g., the "@" nubbin can be inserted into the visual notification to indicate there has been a mention of a user identity).

Figure 7:
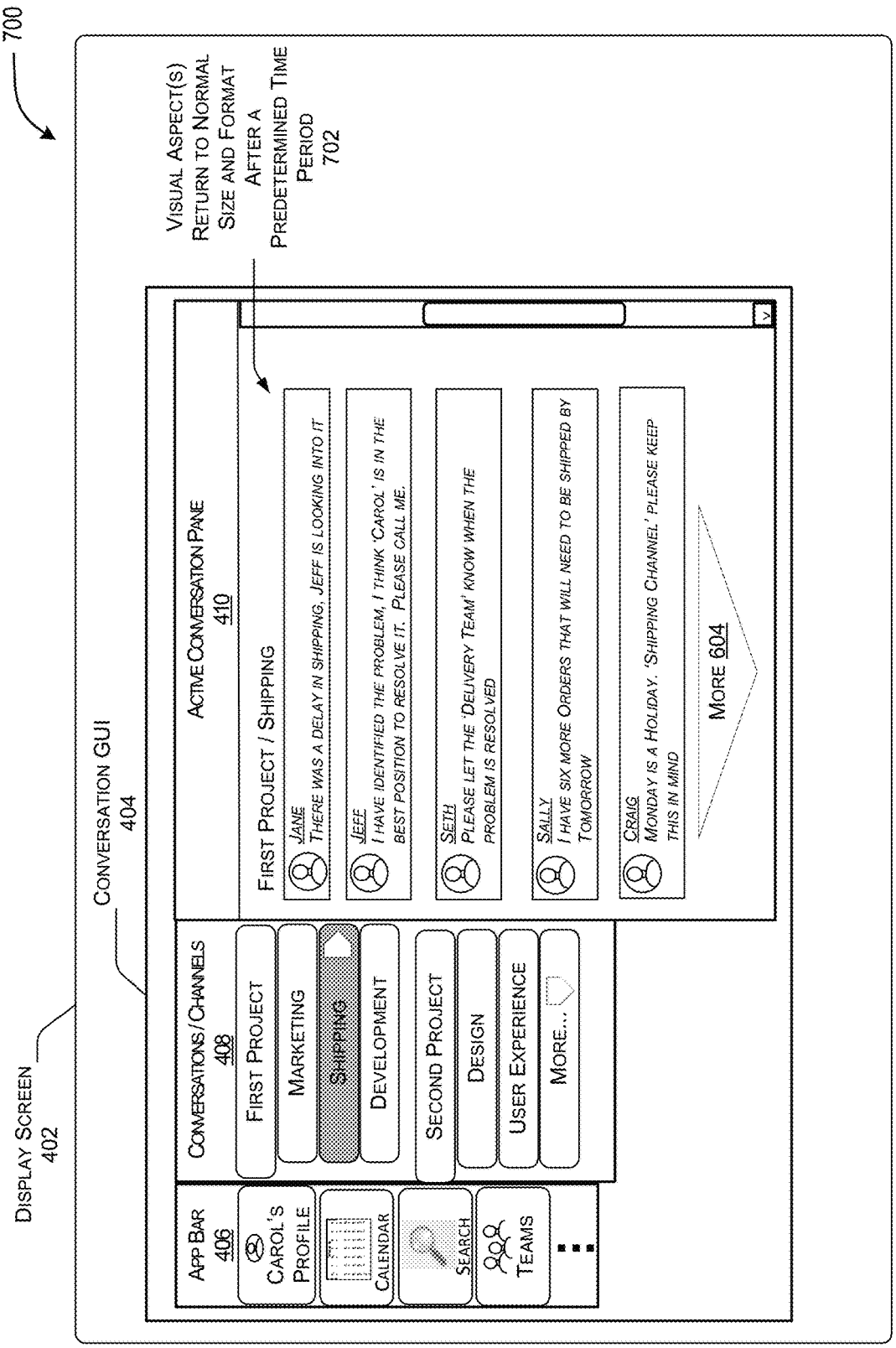
FIG. 7 is an example of a display screen presenting a graphical user interface that illustrates how the visual aspect(s) of the message are returned to their normal size and/or format after a predetermined period of time has expired.

FIG. 7 illustrates an example 700 of the display screen 402 presenting the conversation GUI 404 and how the visual aspect(s) of the message that were previously changed are returned to their normal size and/or format after a predetermined period of time has expired 702. The predetermined period of time can be set so that it is long enough to initially capture the user's focus (e.g., eye gaze). For example, the predetermined period of time can be one second, two seconds, three seconds, etc.

In some instances, the predetermined period of time and/or the predetermined scaling factor can be established based on a size of a display screen and/or a number of messages capable of being displayed in the active conversation pane. In this way, a display screen that is only capable of displaying five messages may configure a shorter period of time and a smaller scaling factor (e.g., one second and 110% of normal size) because it is easier for a user to locate an individual message out of five total messages, while a display screen that is capable of displaying twenty-five messages may configure a longer period of time and a larger scaling factor (e.g., two seconds and 120% of normal size) because it is more difficult for a user to locate an individual message out of twenty-five total messages.

As shown above, the transitions of the conversation GUI 404 from FIG. 5 to one of FIGS. 6A-6C, and then to FIG. 7 can happen in a matter of seconds. In this way, a user can efficiently locate and focus on messages that are likely to be more pertinent and relevant.

In various implementations, if a conversation experiences multiple occurrences of trigger features, a mechanism that enables a user to move, or jump, from viewing a first trigger feature with focus, to viewing a second trigger feature with focus, and so forth, can be provided.

In some implementations, the app bar 406 and/or the list of conversations/channels 408 can always be displayed at or near an edge of the display screen 402 so that a user can view the visual notifications (e.g., even when the user is not actively engaged in a conversation using the active conversation pane 410). In some implementations, such a mobile implementation in which screen size may be limited (e.g., a mobile phone experience), the app bar 406, the list of conversations/channels 408, and/or the active conversation pane 410 can be displayed separately. For instance, upon activating a messaging application, a graphical user interface first displays the list of conversations/channels 408 (some of which may be associated with a visual notification)

. Upon selection of a specific conversation/channel or a visual notification, the graphical user interface can then display the active conversation pane 410 and a portion of the conversation and corresponding messages.

Figure 8:
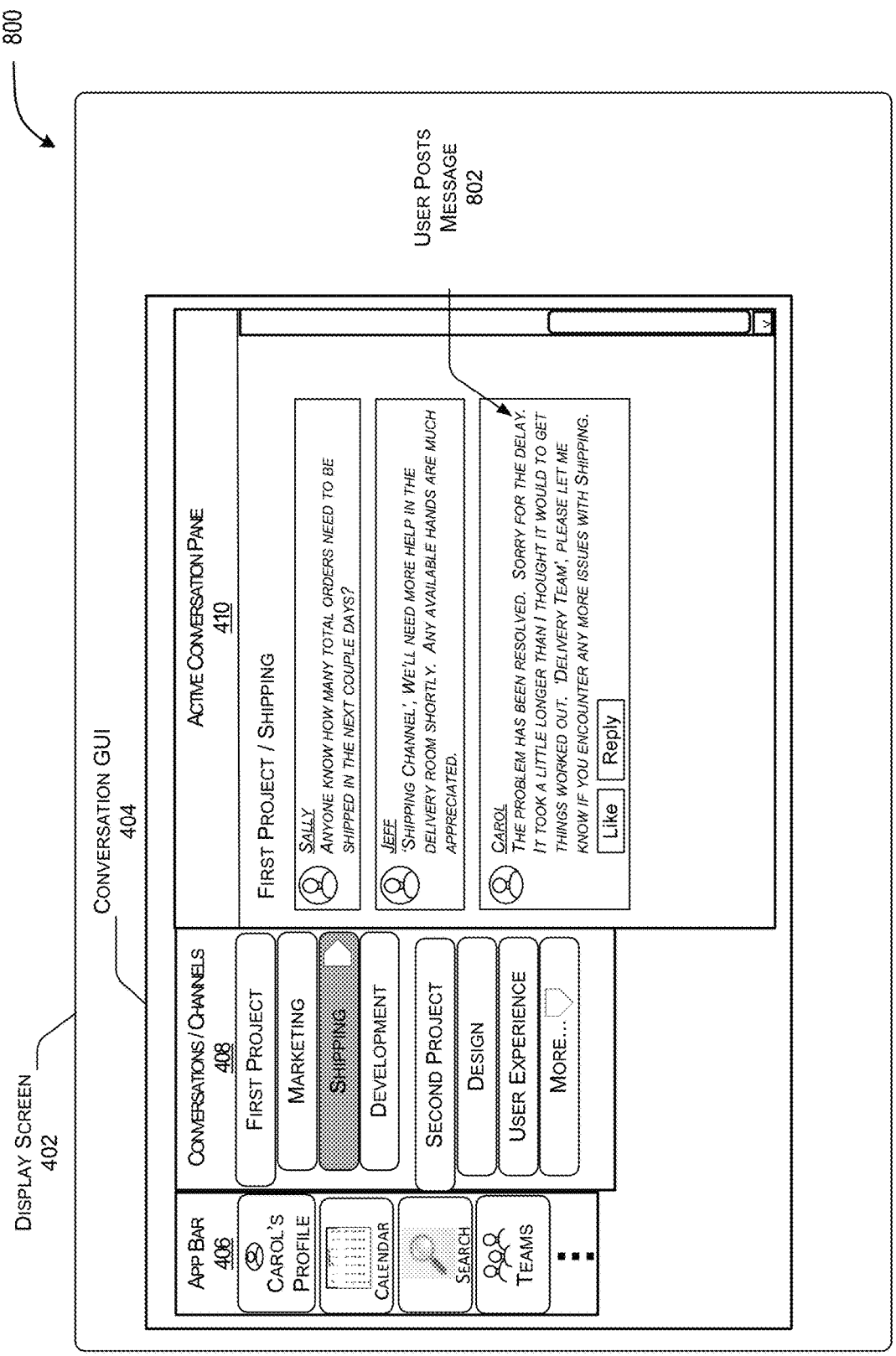
FIG. 8 is an example of a display screen presenting a graphical user interface that illustrates a user posting a new message to a conversation.

FIG. 8 is an example 800 of a display screen 502 presenting the conversation GUI, which illustrates that a user, Carol, is posting a new message 802 to the first project/shipping conversation. As illustrated in association with Carol's message, the messaging application may enable other users to interact with a message. For instance, another user can "like" or in some way approve of the message after Carol posted the message and is no longer actively engaged in the conversation. Additionally or alternatively, another user can "reply" to Carol's message with a comment that directly corresponds to Carol's message after Carol posted the message and is no longer actively engaged in the conversation. These interactions can also comprise types of trigger features that cause a visual notification to be displayed.

Figure 9:
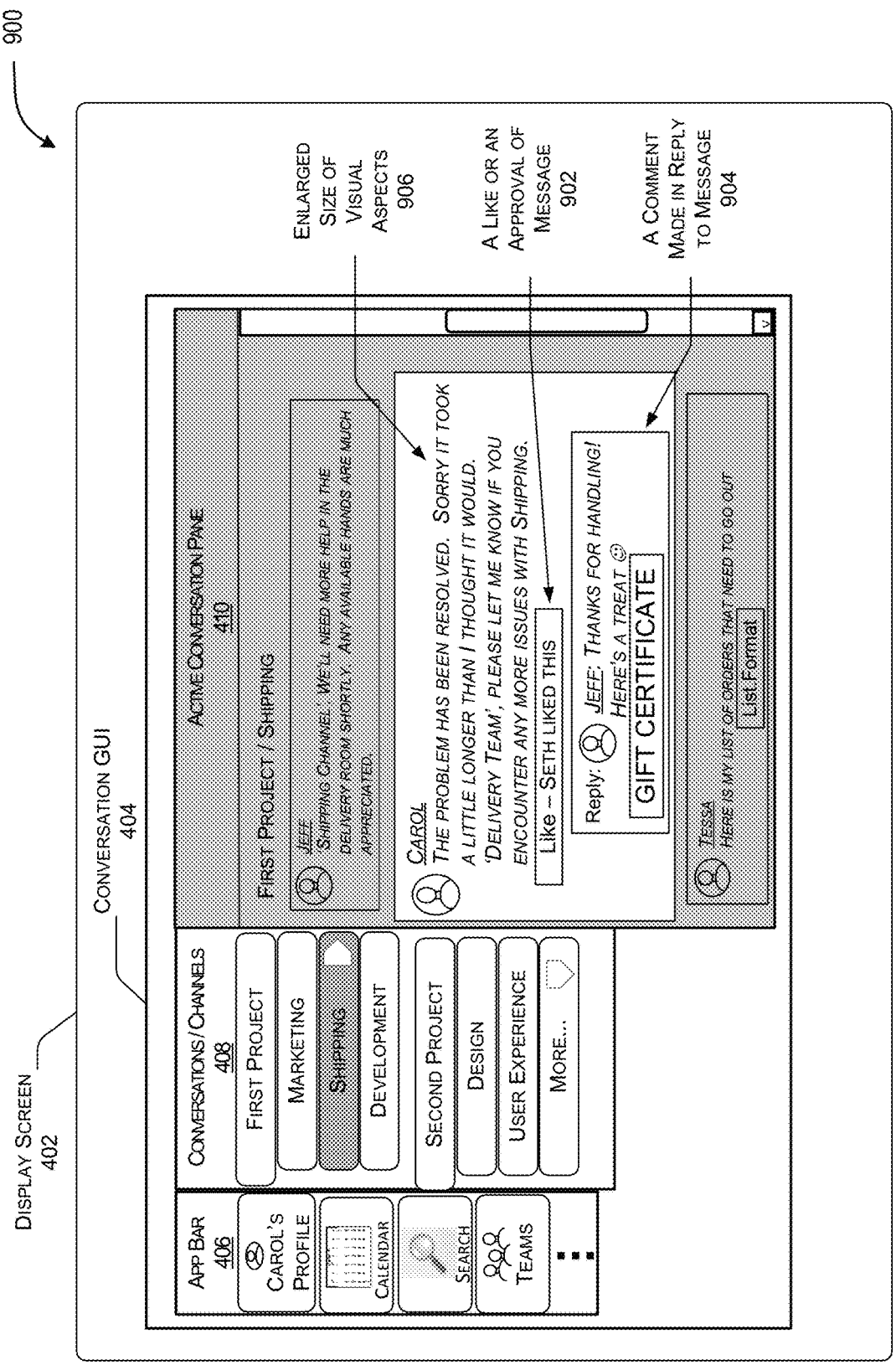
FIG. 9 is an example of a display screen presenting a graphical user interface that illustrates a view of a portion of a conversation and how visual aspect(s) are changed, in response to the input that selects the visual notification, to bring focus to a message that includes a fourth type of trigger feature (e.g., a comment responsive to a previous message posted to the conversation by the user) and/or a fifth type of trigger feature (e.g., a like or an approval of a previous message posted to the conversation by the user).

For instance, in the example 900 of FIG. 9, Seth has "liked" Carol's message 902 and Jeff has provided a "reply" to Carol's message 904, and therefore, in response to input that selects a visual notification, the active conversation pane 410 is switched back to the first project/shipping conversation and one or more visual aspects of Carol's previously posted message are scaled 906 to bring Carol's focus to the interactions of Seth and/or Jeff. For example, the size of the text of the message, the indication of the like, and/or the reply comment can be increased. In another example, a size of the container can be increased (e.g., graphically extended vertically and/or horizontally as shown). In yet another example, a size of an attachment can be increased (e.g., the "Gift Certificate" Jeff gave Carol for resolving the problem). Additionally or alternatively, content that surrounds Carol's message can be dimmed.

EXAMPLE CLAUSES

Example Clause A, a method for a system hosting a conversation, the method comprising: determining that a message that is part of the conversation is associated with a trigger feature; generating a visual notification associated with the trigger feature for display via a computing device; receiving data indicating a selection of the visual notification displayed via the computing device; in response to receiving the data, identifying a portion of the conversation that includes the message that is associated with the trigger feature and at least one other message that surrounds the message in the conversation; and generating at least a portion of a graphical user interface to bring focus to the message as the portion of the conversation is displayed via the computing device, wherein generating the portion of the graphical user interface comprises scaling one or more visual aspects associated with the message from a normal size to an enlarged size for a predetermined period of time to bring the focus to the message, and returning the one or more visual aspects associated with the message from the enlarged size back to the normal size after the predetermined period of time expires.

Example Clause B, the method of Example Clause A, wherein the trigger feature comprises one of: a mention of an identity associated with a user of the computing device via which the visual notification is displayed; a mention of a team of users that includes a user of the computing device via which the visual notification is displayed; or a mention of a channel that is followed by a user of the computing device via which the visual notification is displayed.

Example Clause C, the method of Example Clause A, wherein the message was previously posted to the conversation by a user of the computing device, and the trigger feature comprises one of: an indication that another user liked the message that was previously posted to the conversation by the user of the computing device; or a comment made in reply to the message that was previously posted to the conversation by the user of the computing device.

Example Clause D, the method of any of Example Clauses A through C, wherein at least one visual aspect of the one or more visual aspects comprises text.

Example Clause E, the method of any of Example Clauses A through D, wherein at least one visual aspect of the one or more visual aspects comprises an avatar associated with an identity of a user that posted the message to the conversation.

Example Clause F, the method of any of Example Clauses A through E, wherein at least one visual aspect of the one or more visual aspects comprises a container that comprises the message and that visually separates the message from the at least one other message in the portion of the conversation displayed via the computing device.

Example Clause G, the method of any of Example Clauses A through F, wherein at least one visual aspect of the one or more visual aspects comprises an attachment to the message.

Example Clause H, the method of any of Example Clauses A through G, wherein the visual notification is generated for display in association with a graphical element that represents the conversation.

Example Clause I, the method of any of Example Clauses A through H, wherein generating the portion of the graphical user interface further comprises increasing opaqueness of content that surrounds the message to further bring focus to the message, the content including the at least one other message.

Example Clause J, the method of any one of Example Clauses A through I, further comprising receiving new messages for the conversation that have been more recently posted than the message and the at least one other message, wherein generating the portion of the graphical user interface further comprises generating another visual notification indicative of the new messages, the new messages not displayed in the portion of the graphical user interface.

Example Clause K, the method of any of Example Clauses A through J, further comprising receiving user input that defines a setting to monitor the conversation for occurrences of the trigger feature based on type.

Example Clause L, the method of any of Example Clauses A through K, wherein the visual notification is displayed in another portion of the graphical user interface that is adjacent to the portion of the graphical user interface that displays the portion of the conversation.

While Example Clauses A through L are described above with respect to a method, it is also understood in the context of this disclosure that the subject matter of Example Clauses A through L can additionally and/or alternatively be implemented via a system and/or a device, as well as computer storage media.

Example Clause M, a system comprising: one or more processing units; computer-readable media storing instructions that, when executed by the one or more processing units, cause the system to perform operations comprising: determining that a message that is part of a conversation is associated with a trigger feature; generating a visual notification associated with the trigger feature for display via a computing device; receiving data indicating a selection of the visual notification displayed via the computing device; in response to receiving the data, identifying a portion of the conversation that includes the message that is associated with the trigger feature and at least one other message that surrounds the message in the conversation; and generating at least a portion of a graphical user interface that visually distinguishes between the message and the at least one other message to bring focus to the message as the portion of the conversation is displayed via the computing device.

Example Clause N, the system of Example Clause M, wherein generating the portion of the graphical user interface comprises: scaling one or more visual aspects associated with the message from a normal size to an enlarged size for a predetermined period of time to bring the focus to the message, and returning the one or more visual aspects associated with the message from the enlarged size back to the normal size after the predetermined period of time expires.

Example Clause O, the system of Example Clause N, wherein at least one visual aspect of the one or more visual aspects comprises: text, an avatar associated with an identity of a user that posted the message to the conversation, a container that comprises the message and that visually separates the message from the at least one other message in the portion of the conversation displayed via the computing device.

Example Clause P, the system of Example Clause N or Example Clause O, wherein the predetermined period of time is dynamically established based on a size of a display screen and/or a number of messages displayed in the display screen.

Example Clause Q, the system of any one of Example Clauses M through P, wherein the trigger feature comprises one of: a mention of an identity associated with a user of the computing device via which the visual notification is displayed; a mention of a team of users that includes a user of the computing device via which the visual notification is displayed; or a mention of a channel that is followed by a user of the computing device via which the visual notification is displayed.

Example Clause R, the system of any one of Example Clauses M through Q, wherein generating the portion of the graphical user interface comprises increasing opaqueness of the at least one other message.

Example Clause S, the system of any one of Example Clauses M through R, wherein the visual notification is generated for display in association with a graphical element that represents the conversation.

While Example Clauses M through S are described above with respect to a system, it is also understood in the context of this disclosure that the subject matter of Example Clauses M through S can additionally and/or alternatively be implemented via a method, a device, and/or computer storage media.

Example Clause T, one or more computer storage media storing instructions that, when executed by one or more processing units, cause a system to perform operations comprising: determining that a message that is part of a conversation is associated with a trigger feature; generating a visual notification associated with the trigger feature for display via a computing device; receiving data indicating a selection of the visual notification displayed via the computing device; in response to receiving the data, identifying a portion of the conversation that includes the message that is associated with the trigger feature and at least one other message that surrounds the message in the conversation; and generating at least a portion of a graphical user interface that visually distinguishes between the message and the at least one other message to bring focus to the message as the portion of the conversation is displayed via the computing device.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
monitoring, by one or more processors, messages of a messaging thread;
determining, based at least in part on the monitoring and at a first time, whether a message posted to the messaging thread includes an occurrence of a call-out feature specifying a first user identification corresponding to a first user of the messaging thread and not a second user identification corresponding to a second user of the messaging thread;
receiving additional messages posted to the messaging thread subsequent to the message, the additional messages including a most recent message posted to the messaging thread;
receiving, in association with a second time that is after the first time and via an account associated with the first user identification, a request to view the messaging thread;
in response to receiving the request to view the messaging thread:
based on the message including the occurrence of the call-out feature, identifying a location of the message in the messaging thread to cause a computing device associated with the account to operate in a first mode that displays a first user interface arrangement including the message and not including the most recent message posted to the messaging thread; or
based on the message not including the occurrence of the call-out feature, causing the computing device associated with the account to operate in a second mode that displays a second user interface arrangement including at least some of the additional messages posted to the messaging thread subsequent to the message and not including the message.

2. The method of claim 1, wherein causing the computing device associated with the account to operate in the first mode that displays the first user interface arrangement comprises causing a display to transition from the second user interface arrangement to the first user interface arrangement.

3. The method of claim 1, wherein the first user interface arrangement visually distinguishes the message determined to include the occurrence of the call-out feature from one or more other messages by increasing a size of the message determined to include the occurrence of the call-out feature for a predetermined period of time.

4. The method of claim 3, wherein increasing the size of the message determined to include the occurrence of the call-out feature comprises increasing a size of text from a first text size to a second text size in association with a predetermined scaling factor.

5. The method of claim 3, wherein the predetermined period of time is established based on a size of a display screen.

6. The method of claim 3, wherein the predetermined period of time is established based on a number of messages displayed in the messaging thread.

7. The method of claim 1, wherein the first user interface arrangement visually distinguishes the message determined to include the occurrence of the call-out feature from one or more other messages by changing a format of the message determined to include the occurrence of the call-out feature compared to a format of the one or more other messages for a predetermined period of time.

8. The method of claim 7, wherein changing the format of the message determined to include the occurrence of the call-out feature comprises at least one of:
changing a color of text in the message determined to include the occurrence of the call-out feature so the color of text is different than a color of text in the one or more other messages;
changing a background color of the message determined to include the occurrence of the call-out feature so the background color is different than a background color of the one or more other messages;
increasing the opaqueness of the one or more other messages; or
causing the message determined to include the occurrence of the call-out feature to flash.

9. A system comprising:
one or more processing units; and
computer-readable media storing instructions that, when executed by the one or more processing units, cause the system to perform operations comprising:
monitoring, by one or more processors, messages of a messaging thread;
determining, based at least in part on the monitoring and at a first time, whether a message posted to the messaging thread includes an occurrence of a call-out feature specifying a first user identification corresponding to a first user of the messaging thread and not a second user identification corresponding to a second user of the messaging thread;
receiving additional messages posted to the messaging thread subsequent to the message, the additional messages including a most recent message posted to the messaging thread;
receiving, in association with a second time that is after the first time and via an account associated with the first user identification, a request to view the messaging thread;
in response to receiving the request to view the messaging thread:
based on the message including the occurrence of the call-out feature, identifying a location of the message in the messaging thread to cause a computing device associated with the account to operate in a first mode that displays a first user interface arrangement including the message and not including the most recent message posted to the messaging thread; or
based on the message not including the occurrence of the call-out feature, causing the computing device associated with the account to operate in a second mode that displays a second user interface arrangement including at least some of the additional messages posted to the messaging thread subsequent to the message and not including the message.

10. The system of claim 9, wherein causing the computing device associated with the account to operate in the first mode that displays the first user interface arrangement comprises causing a display to transition from the second user interface arrangement to the first user interface arrangement.

11. The system of claim 9, wherein the first user interface arrangement visually distinguishes the message determined to include the occurrence of the call-out feature from one or more other messages by increasing a size of the message determined to include the occurrence of the call-out feature for a predetermined period of time.

12. The system of claim 11, wherein increasing the size of the message determined to include the occurrence of the call-out feature comprises increasing a size of text from a first text size to a second text size in association with a predetermined scaling factor.

13. The system of claim 11, wherein the predetermined period of time is established based on a size of a display screen.

14. The system of claim 11, wherein the predetermined period of time is established based on a number of messages displayed in the messaging thread.

15. The system of claim 9, wherein the first user interface arrangement visually distinguishes the message determined to include the occurrence of the call-out feature from one or more other messages by changing a format of the message determined to include the occurrence of the call-out feature compared to a format of the one or more other messages for a predetermined period of time.

16. The system of claim 15, wherein changing the format of the message determined to include the occurrence of the call-out feature comprises at least one of:
    changing a color of text in the message determined to include the occurrence of the call-out feature so the color of text is different than a color of text in the one or more other messages;
    changing a background color of the message determined to include the occurrence of the call-out feature so the background color is different than a background color of the one or more other messages;
    increasing the opaqueness of the one or more other messages; or
    causing the message determined to include the occurrence of the call-out feature to flash.

17. One or more computer storage media storing instructions that, when executed by one or more processing units, cause a system to perform operations comprising:
    monitoring, by one or more processors, messages of a messaging thread;
    determining, based at least in part on the monitoring and at a first time, whether a message posted to the messaging thread includes an occurrence of a call-out feature specifying a first user identification corresponding to a first user of the messaging thread and not a second user identification corresponding to a second user of the messaging thread;
    receiving additional messages posted to the messaging thread subsequent to the message, the additional messages including a most recent message posted to the messaging thread;
    receiving, in association with a second time that is after the first time and via an account associated with the first user identification, a request to view the messaging thread;
    in response to receiving the request to view the messaging thread:
        based on the message including the occurrence of the call-out feature, identifying a location of the message in the messaging thread to cause a computing device associated with the account to operate in a first mode that displays a first user interface arrangement including the message and not including the most recent message posted to the messaging thread; or
        based on the message not including the occurrence of the call-out feature, causing the computing device associated with the account to operate in a second mode that displays a second user interface arrangement including at least some of the additional messages posted to the messaging thread subsequent to the message and not including the message.

18. The one or more computer storage media of claim 17, wherein causing the computing device associated with the account to operate in the first mode that displays the first user interface arrangement comprises causing a display to transition from the second user interface arrangement to the first user interface arrangement.

19. The one or more computer storage media of claim 17, wherein the first user interface arrangement visually distinguishes the message determined to include the occurrence of the call-out feature from one or more other messages by increasing a size of the message determined to include the occurrence of the call-out feature for a predetermined period of time.

20. The one or more computer storage media of claim 19, wherein increasing the size of the message determined to include the occurrence of the call-out feature comprises increasing a size of text from a first text size to a second text size in association with a predetermined scaling factor.

* * * * *